(12) United States Patent
Goli et al.

(10) Patent No.: US 10,558,579 B1
(45) Date of Patent: Feb. 11, 2020

(54) SYSTEM AND METHOD FOR ADAPTIVE CACHE

(71) Applicant: Nutanix, Inc., San Jose, CA (US)

(72) Inventors: Srihita Goli, Hyderabad (IN); Lakshit Bhutani, New Delhi (IN); Anoop Jawahar, Bangalore (IN); Gaurav Jain, Bangalore (IN)

(73) Assignee: NUTANIX, INC., San Jose, CA (US)

( * ) Notice: Subject to any disclaimer, the term of this patent is extended or adjusted under 35 U.S.C. 154(b) by 0 days.

(21) Appl. No.: 16/107,267

(22) Filed: Aug. 21, 2018

(51) Int. Cl.
| | | |
|---|---|---|
| *H04L 29/06* | (2006.01) | |
| *G06F 12/0871* | (2016.01) | |
| *G06F 9/455* | (2018.01) | |
| *G06F 12/0893* | (2016.01) | |

(52) U.S. Cl.
CPC ...... *G06F 12/0871* (2013.01); *G06F 9/45558* (2013.01); *G06F 12/0893* (2013.01); *G06F 2009/45583* (2013.01)

(58) Field of Classification Search
None
See application file for complete search history.

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |
| 8,850,130 B1 | 9/2014 | Aron et al. |
| 9,772,866 B1 | 9/2017 | Aron et al. |
| 10,225,365 B1 | 3/2019 | Hotchkies et al. |

OTHER PUBLICATIONS

Benadit et al., "Enhancement of Web Proxy Caching Using Simple k-Means Clustering", International Journal of Scientific & Engineering Research, vol. 5, Issue 5, May 2014 (Year: 2014).*

Sathiyamoorthi et al., "Optimizing the Web Cache Performance by Clustering based Pre-Fetching Technique using Modified ART1", International Journal of Computer Applications (0975-0887), vol. 44—No. 1, Apr. 2012 (Year: 2012).*

(Continued)

*Primary Examiner* — Ryan Bertram
*Assistant Examiner* — Trang K Ta
(74) *Attorney, Agent, or Firm* — Foley & Lardner LLP

(57) ABSTRACT

The system can include a cache and cluster manager. The cache can store a plurality clusters, each of a plurality of clusters including a plurality of cache entries, each of the plurality of cache entries including a plurality of first metadata feature values. The cluster manager can assign a first cache entry corresponding to a data record located in memory to a first cluster based on determining a lowest distance. The lowest distance is determined by operations. The operations can include calculating a plurality of intra cluster feature means. The operations can include receiving a plurality of second metadata feature values of the first cache entry. The operations can include calculating a plurality of distances based on the plurality of intra cluster feature means and the plurality of second metadata feature values. The operations can include determining the first entry having a lowest distance of the plurality of distances.

24 Claims, 8 Drawing Sheets

(56) References Cited

OTHER PUBLICATIONS

Bora et al., "Effect of Different Distance Measures on the Performance of K-Means Algorithm: An Experimental Study in Matlab", International Journal of Computer Science and Information Technologies, vol. 5 (2), 2014, 2501-2506 (Year: 2014).*

Lopes et al., "Automatic Cluster Labeling through Artificial Neural Networks", 2014 International Joint Conference on Neural Networks (IJCNN) (Year: 2014).*

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jun. 25, 2018), from https://nutanixbible.com/.

Poitras, Steven. "The Nutanix Bible" (Jan. 3, 2017), from https://nutanixbible.com/.

Poitras, Steven. "The Nutanix Bible" (Jan. 3, 2018), from https://nutanixbible.com/.

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 8, 2017), from https://nutanixbible.com/.

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

"ARC: A Self-Tuning, Low Overhead Replacement Cache", Megiddo, et al.; Proceedings of FAST '03: 2nd USENIX Conference on File and Storage Technologies, Mar. 31, 2003, The USENIX Association, retrieved from http://www.usenix.org/events/fast03/tech/full_papers/megiddo/megiddo.pdf.

"A Survey on Feature Weighting based K-Means Algorithms", Renato Cordeiro de Amorim, May 21, 2017, retrieved from https://arxiv.org/abs/1601.03483.

"Experimental Evaluation of Feature Selection Methods for Clustering", Azizyan, et al., date unknown, retrieved from https://www.ml.cmu.edu/research/dap-papers/dap_azizyan.pdf.

"Unsupervised Feature Selection for the k-means Clustering Problem", Boutsidis, et al., date unknown, retrieved from https://www.stat.berkeley.edu/~mmahoney/pubs/NIPS09.pdf.

Cano, Ignacio, et al. "Curator: Self-Managing Storage for Enterprise Clusters" (Mar. 27, 2017), from https://www.usenix.org/conference/nsdi17/.

* cited by examiner

SYSTEM AND METHOD FOR ADAPTIVE CACHE

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present day virtual computing systems have limitations due to their configuration and the way they operate.

SUMMARY

In accordance with some other aspects of the present disclosure, a system is disclosed. The system can include a cache. The cache can store a plurality of clusters. Each of the plurality of clusters can include a plurality of cache entries and each of the plurality of cache entries can include a plurality of metadata features. Each of the plurality of metadata features can include a metadata feature type of a plurality of metadata feature types and a first metadata feature value of a plurality of first metadata feature values. The plurality of metadata feature types can be common to all of the plurality of cache entries of all of the plurality of clusters. The system can include a cache manager that assigns a first cache entry associated with a data record located in memory to a first cluster of the plurality of clusters based on determining a lowest total distance. The lowest total distance is determined by operations. The operations can include calculating a plurality of intra cluster feature means. In some embodiments, each of the plurality of metadata feature types of each of the plurality of clusters includes an intra cluster feature mean. The intra cluster feature mean can be based on a subset of the plurality of first metadata feature values. The subset of the plurality of first metadata feature values can correspond to a same metadata feature type and a same cluster as the intra cluster feature mean. The operations can include receiving a plurality of second metadata feature values of the first cache entry. In some embodiments, each of the plurality of second metadata feature values corresponds to one of the plurality of metadata feature types. The operations can include calculating a plurality of feature distances. In some embodiments, each of the plurality of metadata feature types of each of the plurality of clusters includes a feature distance. The feature distance can be based on a corresponding intra cluster feature mean and a corresponding second metadata feature value of the first cache entry. The operations can include calculating a plurality of total distances. In some embodiments, each of the plurality of clusters includes a total distance. The total distance can be calculated based on a subset of the plurality of feature distances associated with a same cluster. The operations can include determining the first entry having a lowest total distance of the plurality of total distances.

In accordance with some aspects of the present disclosure, a method is disclosed. The method can include determining a plurality of first metadata feature values. Each cluster of a plurality of clusters can include a plurality of cache entries and each of the plurality of cache entries can include a plurality of metadata features. Each of the plurality of metadata features can include a plurality of metadata feature types and the plurality of first metadata feature values. The plurality of metadata feature types can be common to all of the plurality of cache entries of all of the plurality of clusters. The method can include a cache manager that assigns a first cache entry associated with a data record located in memory to a first cluster of the plurality of clusters based on determining a lowest total distance. The lowest total distance is determined by operations. The operations can include calculating a plurality of intra cluster feature means. In some embodiments, each of the plurality of metadata feature types of each of the plurality of clusters includes an intra cluster feature mean. The intra cluster feature mean can be based on a subset of the plurality of first metadata feature values. The subset of the plurality of first metadata feature values can correspond to a same metadata feature type and a same cluster as the intra cluster feature mean. The operations can include receiving a plurality of second metadata feature values of the first cache entry. In some embodiments, each of the plurality of second metadata feature values corresponds to one of the plurality of metadata feature types. The operations can include calculating a plurality of feature distances. In some embodiments, each of the plurality of metadata feature types of each of the plurality of clusters includes a feature distance. The feature distance can be based on a corresponding intra cluster feature mean and a corresponding second metadata feature value of the first cache entry. The operations can include calculating a plurality of total distances. In some embodiments, each of the plurality of clusters includes a total distance. The total distance can be calculated based on a subset of the plurality of feature distances associated with a same cluster. The operations can include determining the first entry having a lowest total distance of the plurality of total distances.

In accordance with yet other aspects of the present disclosure, a non-transitory computer readable media with computer-executable instructions stored thereon is disclosed. The instructions when executed by one or more processors can cause the one or more processors to perform operations. The operations include determining a plurality of first metadata feature values. Each cluster of a plurality of clusters can include a plurality of cache entries and each of the plurality of cache entries can include a plurality of metadata features. Each of the plurality of metadata features can include a metadata feature type of a plurality of metadata feature types and a first metadata feature value of the plurality of first metadata feature values. The plurality of first metadata feature types can be common to all of the plurality of cache entries of all of the plurality of clusters. The operations can include assigning a first cache entry associated with a data record located in memory to a first cluster of the plurality of clusters based on determining a lowest total distance. The lowest total distance is determined by a subset of the operations. The subset of the operations can include calculating a plurality of intra cluster feature means. In some embodiments, each of the plurality of metadata feature types of each of the plurality of clusters includes an intra cluster feature mean. The intra cluster feature mean can be based on a subset of the plurality of first metadata feature values. The subset of the plurality of first metadata feature values can correspond to a same metadata feature type and a same cluster as the intra cluster feature mean. The subset of the operations can include receiving a plurality of second metadata feature values of the first cache entry. In some embodiments, each of the plurality of second metadata feature values corresponds to one of the plurality of metadata feature types. The subset of the operations can include calculating a plurality of feature distances. In some embodiments, each of the plurality of metadata feature types of each of the plurality of clusters includes a feature distance. The feature distance can be based on a corresponding intra cluster feature mean and a corresponding second metadata feature value of the first cache entry. The subset of the operations can include calculating a plurality of total distances. In some embodiments, each of the plurality of clusters includes a total distance. The total distance can be calculated based on a subset of the plurality of feature distances associated with a same cluster. The subset of the operations can include determining the first entry having a lowest total distance of the plurality of total distances.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
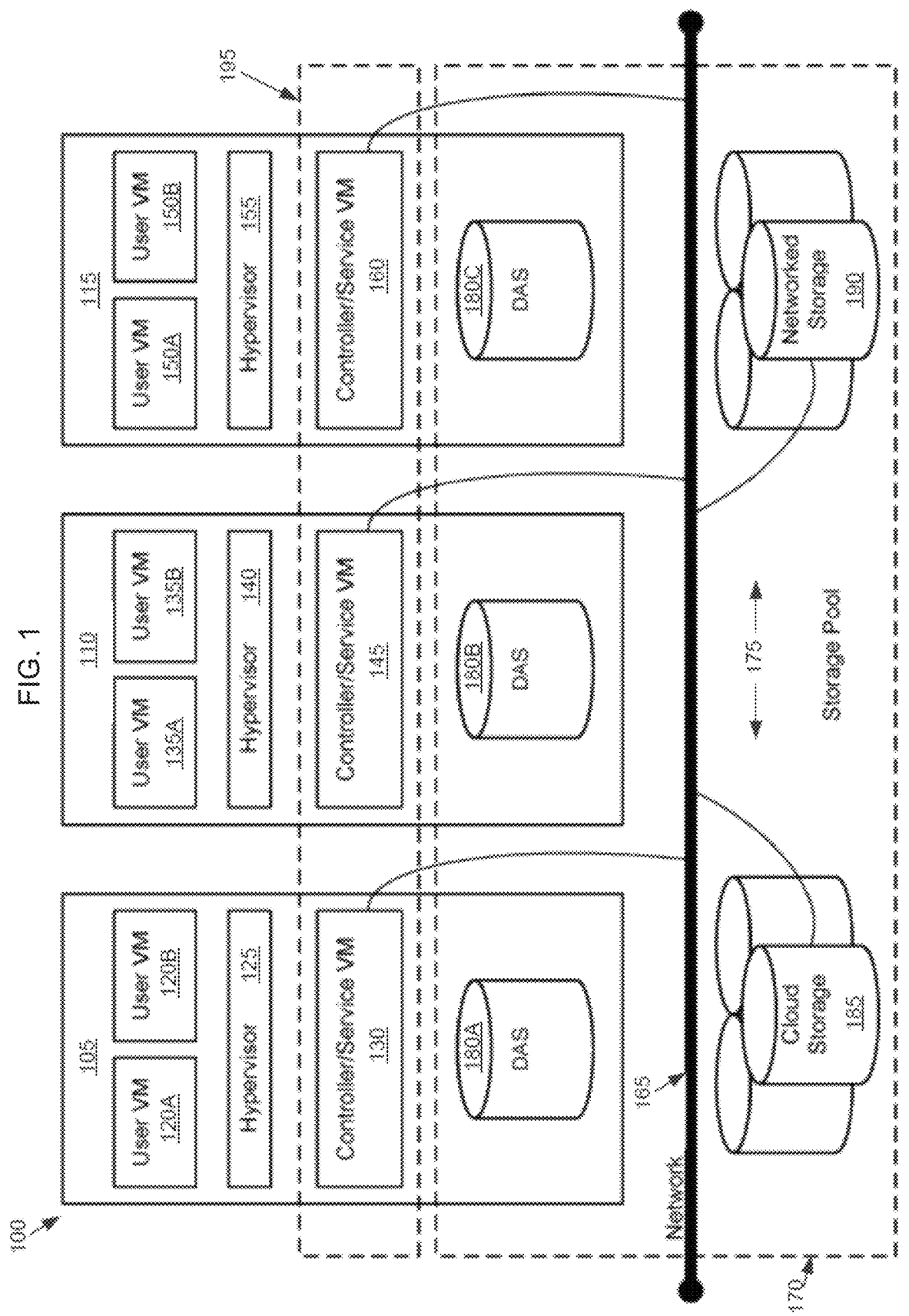
FIG. 1 is an example block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The performance of any modern storage system greatly depends on efficiency and speed of the cache it uses. Due to a limited size of the cache, the cache cannot store all of the user requested data. Thus, the cache has to make smart decisions as to which subset of the data to keep and which subset of the data to evict from its storage. The efficiency of the cache is measured by a hit rate, which is a number or a percentage of data accesses that are served from the cache. The average speed of accessing data from the storage system correlates with the hit rate. The cache speed can be measured by latency, which is an amount of time it takes the cache to make a decision. Systems level caching algorithms have stronger latency constraints than application level caching algorithms like web caching. Systems level caching can be embodiments in which the cache decision making is performed for multiple users at a host level or at a network level, as opposed to being performed for one user at a session level.

Two conventional eviction control caching algorithms are LRU (least recently used) algorithm and LFU (least frequently used) algorithm. LRU and LFU can only provide good hit rates if a user access pattern supports the eviction strategy of either LRU or LFU. But the access pattern can be erratic and does not always remain LRU friendly or LFU friendly. Thus, LRU and LFU can result in inconsistent hit rates for diverse user access patterns. The inconsistent hit rate can result in a higher latency, on average, when accessing data.

Some conventional eviction control caching algorithms use feature selection algorithms for tuning machine learning models in order to improve the hit rate. The feature selection algorithms were frequently used in online and offline web caching systems. However, the feature selection algorithms involve complex computations that add considerable latency overhead, especially for system level caches which will have to respond to more frequent data accesses due to a higher number of users. Thus, the latency of the decision making results in the higher latency when accessing data.

Thus, a technical problem exists of enabling a storage system whose caching algorithm simultaneously achieves a high hit rate and a low latency overhead for system level caches. The present disclosure provides technical solutions to the technical problem. The present solution can adapt itself to changing user access patterns and give good hit rates for both LRU and LFU friendly workloads, resulting in consistently high hit rates. The proposed system and method achieves the consistent high hit rate by applying k-means clustering to an cache eviction algorithm. The approach can be expanded to features other than recency and frequency, such as spatial locality and data types. Thus, the present disclosure can be optimized for workloads that favor special locality or certain data types.

Furthermore, the present solution implements a computationally light feature selection algorithm to give greater weight to more important features. Cluster variance can be used as a proxy for feature importance. The cluster variance may be computed as a ratio of an inter cluster feature variance and a intra cluster feature variance. By separating cluster variance computations into the inter cluster feature variance and the intra cluster feature variance and by approximating the intra cluster feature variance, the proposed method and system can be used in system level caches to improve the hit rate without adding considerable latency overhead.

Referring now to FIG. 1, a virtual computing system 100 is shown, in accordance with some embodiments of the present disclosure. The virtual computing system 100 includes a plurality of nodes, such as a first node 105, a second node 110, and a third node 115. Each of the first node 105, the second node 110, and the third node 115 may also be referred to as a "host" or "host machine." The first node 105 includes user virtual machines ("user VMs") 120A and 120B (collectively referred to herein as "user VMs 120"), a hypervisor 125 configured to create and run the user VMs, and a controller/service VM 130 configured to manage, route, and otherwise handle workflow requests between the various nodes of the virtual computing system 100. The controller/service VM 130 can be referred to as a controller VM 130 or a CVM 130. Similarly, the second node 110 includes user VMs 135A and 135B (collectively referred to herein as "user VMs 135"), a hypervisor 140, and a controller/service VM 145, and the third node 115 includes user VMs 150A and 150B (collectively referred to herein as "user VMs 150"), a hypervisor 155, and a controller/service VM 160. The controller/service VM 130, the controller/service VM 145, and the controller/service VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The virtual computing system 100 also includes a storage pool 170. The storage pool 170 may include network-attached storage 175 and direct-attached storage 180A, 180B, and 180C. The network-attached storage 175 is accessible via the network 165 and, in some embodiments, may include cloud storage 185, as well as local storage area network 190. In contrast to the network-attached storage 175, which is accessible via the network 165, the direct-attached storage 180A, 180B, and 180C includes storage components that are provided internally within each of the first node 105, the second node 110, and the third node 115, respectively, such that each of the first, second, and third nodes may access its respective direct-attached storage without having to access the network 165.

It is to be understood that only certain components of the virtual computing system 100 are shown in FIG. 1. Nevertheless, several other components that are needed or desired in the virtual computing system 100 to perform the functions described herein are contemplated and considered within the scope of the present disclosure. Some additional features of the virtual computing system 100 are described in U.S. Pat. No. 8,601,473, the entirety of which is incorporated by reference herein.

Although three of the plurality of nodes (e.g., the first node 105, the second node 110, and the third node 115) are shown in the virtual computing system 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150).

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100. In some embodiments, the virtual computing system 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service VM 130, the controller/service VM 145, and the controller/service VM 160, and/or the hypervisor 125, the hypervisor 140, and the hypervisor 155. One or more of the first node 105, the second node 110, and the third node 115 may be organized in a variety of network topologies.

Also, although not shown, one or more of the first node 105, the second node 110, and the third node 115 may include one or more processing units configured to execute instructions. The instructions may be carried out by a special purpose computer, logic circuits, or hardware circuits of the first node 105, the second node 110, and the third node 115. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 170, as well as with other elements of the first node 105, the second node 110, and the third node 115 to receive, send, and process information, and to control the operations of the underlying first, second, or third node. The processing units may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. Further, the processing units may include a single stand-alone processing unit, or a plurality of processing units that use the same or different processing technology.

With respect to the storage pool 170 and particularly with respect to the direct-attached storage 180A, 180B, and 180C, each of the direct-attached storage may include a variety of types of memory devices. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 175 may include any of a variety of network accessible storage (e.g., the cloud storage 185, the local storage area network 190, etc.) that is suitable for use within the virtual computing system 100 and accessible via the network 165. The storage pool 170, including the network-attached storage 175 and the direct-attached storage 180A, 180B, and 180C, together form a distributed storage system configured to be accessed by each of the first node 105, the second node 110, and the third node 115 via the network 165, the controller/service VM 130, the controller/service VM 145, the controller/service VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 may include a software-based implementation of a computing machine in the virtual computing system 100. The user VMs 120, the user VMs 135, and the user VMs 150 may emulate the functionality of a physical computer. Specifically, the hardware resources, such as processing unit, memory, storage, etc., of the underlying computer (e.g., the first node 105, the second node 110, and the third node 115) may be virtualized or transformed by the respective hypervisor 125, the hypervisor 140, and the hypervisor 155, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 may be compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow.

The user VMs 120, the user VMs 135, and the user VMs 150 are controlled and managed by their respective instance of the controller/service VM 130, the controller/service VM 145, and the controller/service VM 160. The controller/service VM 130, the controller/service VM 145, and the controller/service VM 160 are configured to communicate with each other via the network 165 to form a distributed system 195. Each of the controller/service VM 130, the controller/service VM 145, and the controller/service VM 160 may also include a local management system configured to manage various tasks and operations within the virtual computing system 100. For example, in some embodiments, the local management system may perform various management related tasks on the user VMs 120, the user VMs 135, and the user VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the user VMs 120, the user VMs 135, and the user VMs 150, respectively, and for managing the interactions between those user VMs and the underlying hardware of the first node 105, the second node 110, and the third node 115. Each of the controller/service VM 130, the controller/service VM 145, the controller/service VM 160, the hypervisor 125, the hypervisor 140, and the hypervisor 155 may be configured as suitable for use within the virtual computing system 100.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. For example, a particular user VM (e.g., the user VMs 120, the user VMs 135, or the user VMs 150) may direct an input/output request to the controller/service VM (e.g., the controller/service VM 130, the controller/service VM 145, or the controller/service VM 160, respectively) on the underlying node (e.g., the first node 105, the second node 110, or the third node 115, respectively). Upon receiving the input/output request, that controller/service VM may direct the input/output request to the controller/service VM (e.g., one of the controller/service VM 130, the controller/service VM 145, or the controller/service VM 160) of the leader node. In some cases, the controller/service VM that receives the input/output request may itself be on the leader node, in which case, the controller/service VM does not transfer the request, but rather handles the request itself.

The controller/service VM of the leader node may fulfil the input/output request (and/or request another component within the virtual computing system 100 to fulfil that request). Upon fulfilling the input/output request, the controller/service VM of the leader node may send a response back to the controller/service VM of the node from which the request was received, which in turn may pass the response to the user VM that initiated the request. In a similar manner, the leader node may also be configured to receive and handle requests (e.g., user requests) from outside of the virtual computing system 100. If the leader node fails, another leader node may be designated.

Furthermore, one or more of the first node 105, the second node 110, and the third node 115 may be combined together to form a network cluster. Generally speaking, all of the nodes (e.g., the first node 105, the second node 110, and the third node 115) in the virtual computing system 100 may be divided into one or more network clusters. One or more components of the storage pool 170 may be part of the network cluster as well. For example, the virtual computing system 100 as shown in FIG. 1 may form one network cluster in some embodiments. Multiple network clusters may exist within a given virtual computing system (e.g., the virtual computing system 100). The user VMs 120, the user VMs 135, and the user VMs 150 that are part of a network cluster are configured to share resources with each other. In some embodiments, multiple network clusters may share resources with one another.

Again, it is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Figure 2:
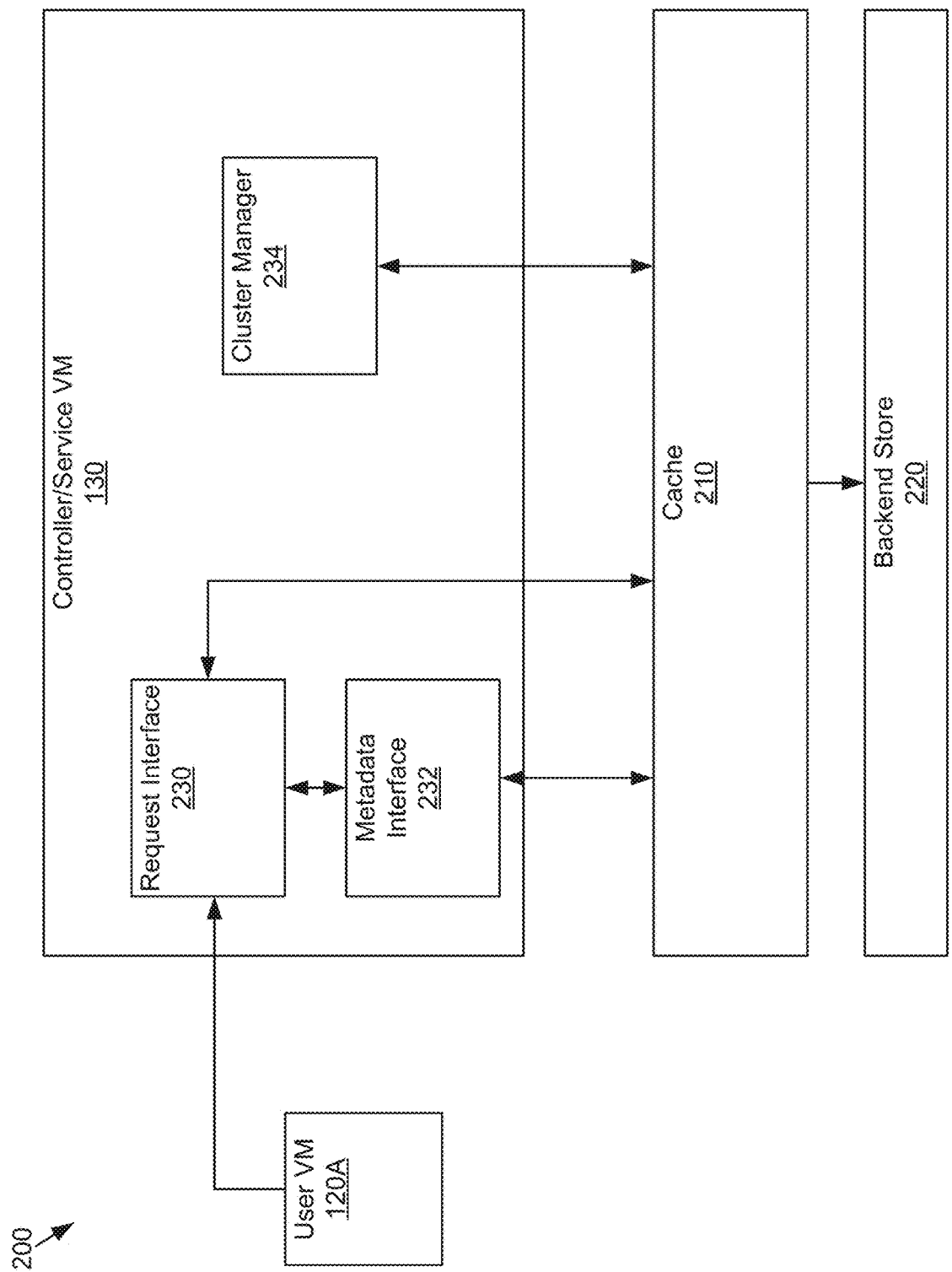
FIG. 2 is an example block diagram of an adaptive cache system, in accordance with some embodiments of the present disclosure.

FIG. 2 is an example block diagram of an adaptive cache system 200, in accordance with some embodiments of the present disclosure. The adaptive cache system 200 can include the user VM 120A, the CVM 130, a cache 210 and a backend store 220. The user VM 120A can be coupled to the CVM 130 and can be configured to send a first request to the CVM 130. The first request can be a request to access data at an address location in the backend store 220. The CVM 130 can be coupled to the cache 210 and can be configured to send a second request to the cache 210. In some embodiments not shown, the CVM 130 includes the cache 210 or a local cache. The CVM 130 can be configured to send the second request to the local cache 210.

Responsive to the cache 210 having the requested data (also known as a cache hit), the cache 210 can be configured send a response including the requested data. The cache 210 can be coupled to the backend store 220. Responsive to the cache 210 not having the data (also known as a cache miss), the cache 210 can be configured to send a third request to the backend store 220 including the address location of the requested data.

In some embodiments, the cache 210 is located in one or more processors in the first node 105. The cache 210 can have a plurality of levels, such as an L1 cache, an L2 cache, an L3 cache and system memory, which are located different distances away from one or more processing cores of the one or more processor and have corresponding levels of data access latency overhead. Responsive to not having the requested data, the L1 cache can request the data from the L2 cache, and so on. In some embodiments, the cache 210 is located in one or more of the DAS 180A, 180B, and 180C. In some embodiments, the cache 210 is located in the network-attached storage 175. The cache 210 may be implemented as one or more of any type of RAM, ROM, flash memory, magnetic storage devices, optical disks, smart cards, solid state devices, and the like. The cache 210 may be one of a browser cache, a memory cache, a disk cache and a processor cache. The cache 210 can be implemented as hardware, software, or a combination thereof.

Responsive to receiving the third request from the cache 210, the backend store 220 can be configured to send a response including the requested data. In some embodiments, the backend store 220 is located in the storage pool 170. The backend store 220 can include one or more of any type of RAM, ROM, flash memory, magnetic storage devices, optical disks, smart cards, solid state devices, and the like.

Figure 3:
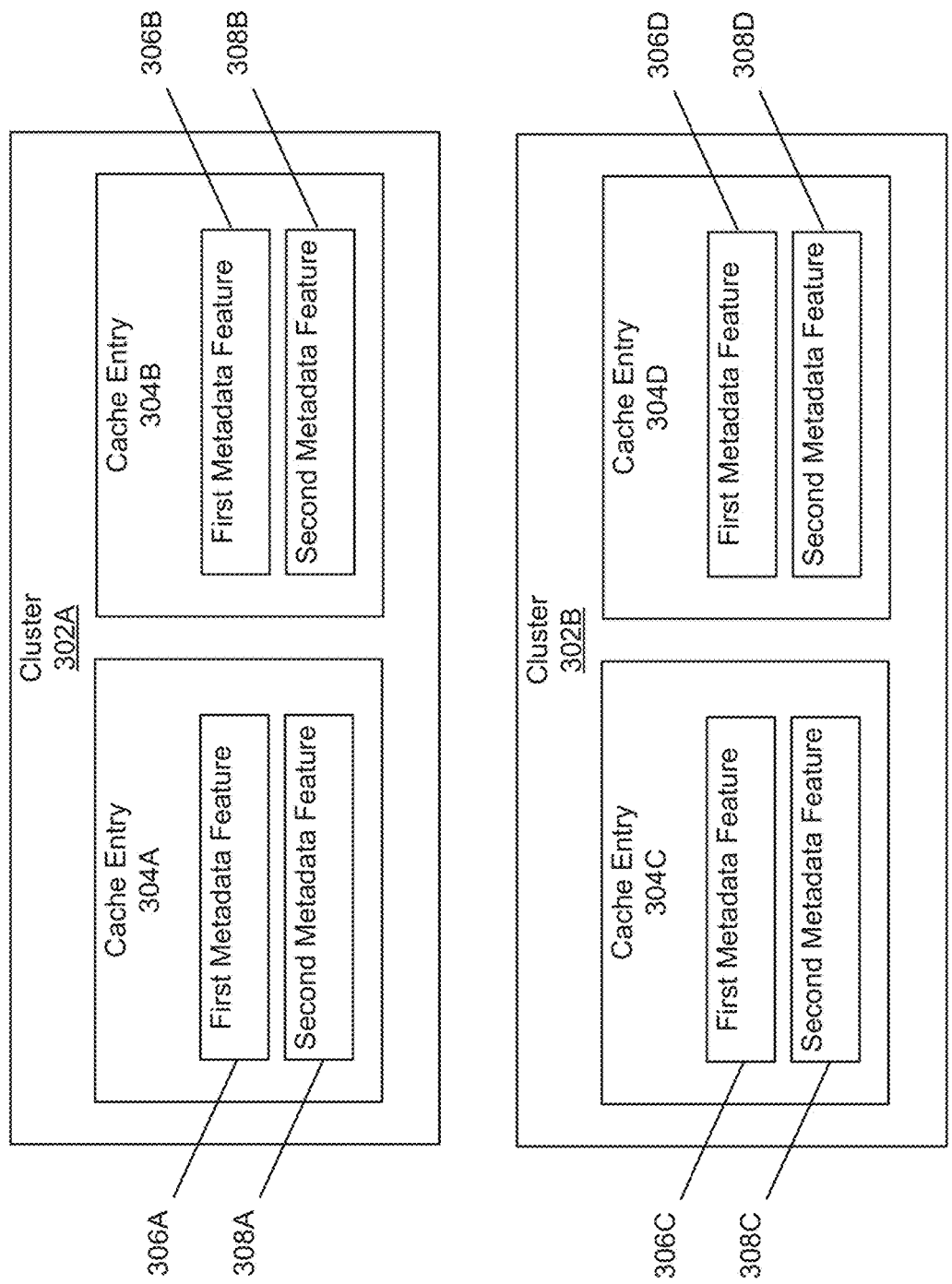
FIG. 3 is an example block diagram of contents of the cache, in accordance with the embodiment of the adaptive cache system in FIG. 2.

FIG. 3 is an example block diagram of contents of the cache 210, in accordance with the embodiment of the adaptive cache system 200 in FIG. 2. The cache can include cluster 302A and cluster 302B (collectively referred to herein as "clusters 302"). Although two clusters (e.g. cluster 302A and cluster 302B) are shown, in some embodiments, the cache 210 may have more or less cache entries. Cluster 302A can include cache entry 304A and cache entry 304B. Cluster 302B can include cache entry 304C and 304D. (collectively referred to herein as "cache entries 304") stored in memory addresses in the cache. Although two cache entries (e.g. the cache entry 304A, the cache entry 304B) are shown in each cluster (e.g. cluster 302A), in some embodiments, the cache 210 may have more or less cache entries. Further, cluster 302A and cluster 302B need not always have the same number of the cache entries.

Each of the cache entries 304 can include a tag, a data block, and flag bits. The data block can include one or more of data and metadata. The tag can include the requested address location (e.g. the address location in the backend store 220) of the one or more of data and metadata. The flag bits can include information associated with whether the one or more of data and metadata is updated. A data record is the one or more data and metadata located in the address location in the backend store 220. The cache entries 304 can be implemented as one or more of a xml file, a JSON packet, a lookup table, a linked list, a protocol buffer, a flat buffer, and the like.

The cache entry 304A can include a first metadata feature 306A and a second metadata feature 308A. The cache entry 304B can include a first metadata feature 306B and a second metadata feature 308B. The cache entry 304C can include a first metadata feature 306C and a second metadata feature 308C. The cache entry 304D can include a first metadata feature 306D and a second metadata feature 308D. The first metadata features 306A, 306B, 306C, and 306D are collectively referred to herein as "first metadata features 306." The second metadata features 308A, 308B, 308C, and 308D are collectively referred to herein as "second metadata features 308." The first metadata features 306 and the second metadata features 308 are collectively referred to herein as "metadata features." Although two metadata features (e.g. first metadata feature 306A and second metadata feature 308A) are shown in each cache entry (e.g. cache entry 304A), in some embodiments, each of the cache entries 304 may have greater than or less than two metadata features.

Each of the metadata features can include a metadata feature type and a metadata feature value. For example, the first metadata features 306 can include a first metadata feature type and the second metadata features 308 can include a second metadata feature type different from the first metadata feature type. Each of the metadata feature types can include one of a timestamp, a number of time accessed in a pre-defined time period, an address, a client identifier (ID), a data type (e.g. data or metadata), and the like. Some of the metadata features types are associated with metadata feature values that are continuous (e.g. can be any real number) and some of the metadata feature types are associated with metadata feature values that are discrete (e.g. a name of a client or a data type). In some embodiments, responsive to receiving the requested data from the backend store 220, the cache 210 can generate a new cache entry of the cache entries 304. In some embodiments, responsive to receiving a data access request for data associated with a first existing cache entry (e.g. cache entry 304A) from the CVM 130, the cache 210 can update the metadata feature values associated with the first existing cache entry. In some embodiments, responsive to receiving a data write request associated with a second existing cache entry (e.g. cache entry 304B) from the CVM 130, the cache 210 updates the second existing cache entry Referring back to FIG. 2, the CVM 130 can include a request interface 230, a metadata interface 232, and a cluster manager 234. The request interface 230 can be coupled to the user VM 120A, the cache 210, and the metadata interface 232. In some embodiments, the request interface 230 is configured to generate the second request by forwarding the first request to the cache 210. Accessing the cache 210 by the request interface 230 can be referred to as a data lookup. In some embodiments, the request interface 230 is configured to determine which cache 210 of a plurality of caches to send the second request to, based on a unique identifier in the first request. In some embodiments, the request interface 230 is configured to send a sub-request to the metadata interface 232. In some embodiments, the cache 210 sends a response to the second request. Responsive to receiving the response indicating that the cache 210 does not include the requested data, the request interface 230 can be configured to send a cache entry request to the cache 210 to generate a new cache entry.

The request interface 230 may include instructions and one or more processing units configured to execute the instructions of the request interface 230. The instructions may be carried out by a special purpose computer, logic circuits, or hardware circuits of the request interface 230. The processing units may be implemented in hardware, firmware, software, or any combination thereof. The request interface 230 can be implemented as application. The request interface 230 may be stored in the storage pool 170. The request interface 230 executed by one or more processors in the storage pool 170.

The metadata interface 232 can be coupled to the request interface 230 and the cache 210. In some embodiments, responsive to receiving the sub-request from the request interface 230, the metadata interface 232 is configured to send a metadata request to the cache 210 for metadata associated with the requested data. Accessing the cache 210 by the metadata interface 232 can be referred to as a metadata lookup. Responsive to receiving the metadata associated with the requested data, the metadata interface 232 can be configured to respond to the sub-request by the request interface 230, The response to the metadata interface 232 can include the metadata associated with the requested data.

The metadata interface 232 may include instructions and one or more processing units configured to execute the instructions of the metadata interface 232. The instructions may be carried out by a special purpose computer, logic circuits, or hardware circuits of the metadata interface 232. The processing units may be implemented in hardware, firmware, software, or any combination thereof. The metadata interface 232 can be implemented as application. The metadata interface 232 may be stored in the storage pool 170. The metadata interface 232 executed by one or more processors in the storage pool 170.

Figure 4:
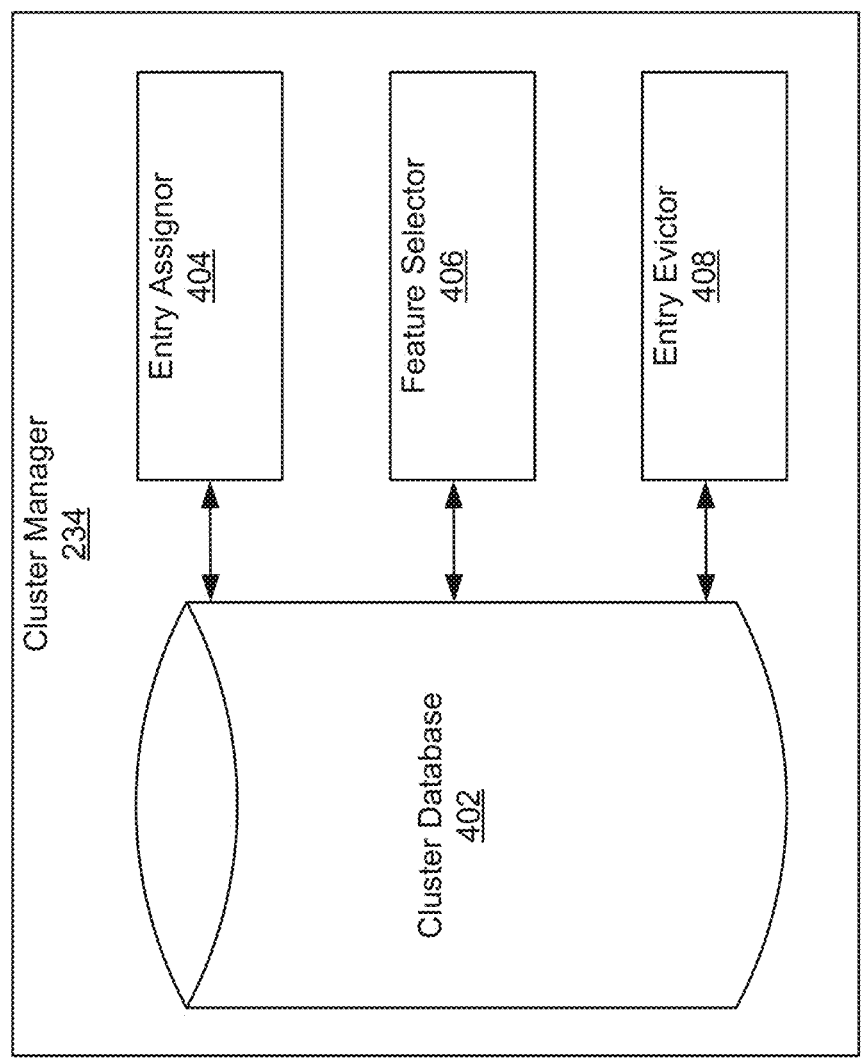
FIG. 4 is an example block diagram of a cluster manager, in accordance with the embodiment of the adaptive cache system in FIG. 2.

FIG. 4 is an example block diagram of a cluster manager 234, in accordance with the embodiment of the adaptive cache system 200 in FIG. 2. The cluster manager 234 can be configured to group together similar cache entries of the cache entries 304 in a cluster. The cluster manager 234 can be coupled to the cache 210 shown in FIG. 2. In some embodiments, the cluster manager 234 is located in the cache 210. The cluster manager 234 may include the cluster database 402, the entry assignor 404, the feature selector 406, and the entry evictor 408. The cluster manager 234 can be configured to store information associated with a plurality of clusters. The cluster manager 234 can be configured to assign each of the cache entries 304 to one of the plurality of clusters 302 based on the metadata features (e.g. the first metadata feature 306A and the second metadata feature 308A) associated with each of the cache entries 304. The cluster manager 234 can be configured to determine which cache entry to evict from the cache 210 based on criteria associated with the plurality of clusters 302 and criteria associated with each of the cache entries 304.

The cluster manager 234 may include instructions and one or more processing units configured to execute the instructions of the cluster manager 234. The instructions may be carried out by a special purpose computer, logic circuits, or hardware circuits of the cluster manager 234. The processing units may be implemented in hardware, firmware, software, or any combination thereof. The cluster manager 234 can be implemented as application. The cluster manager 234 may be stored in the storage pool 170. The cluster manager 234 executed by one or more processors in the storage pool 170.

The cluster database 402 can be configured to store cluster information associated with the plurality of clusters 302. The cluster information can include a plurality of intra cluster feature means. An intra cluster feature mean of the plurality of intra cluster feature means can be computed as a mean of a subset of the metadata feature values, wherein the subset of the metadata feature values includes all metadata feature values associated with a same metadata feature type (e.g. the first metadata features 306) and a same cluster (e.g. the cluster 302A). Thus, each of the plurality of clusters 302 includes a plurality of metadata feature types, and each of the plurality of metadata feature types has an associated intra cluster feature mean.

The cluster information can include a plurality of intra cluster feature variances. An intra cluster feature variance of the plurality of intra cluster feature variances can be computed as a variance of a subset of the metadata feature values, wherein the subset of the metadata feature values includes all metadata feature values associated with a same metadata feature type and a same cluster. Thus, each of the plurality of clusters 302 includes a plurality of metadata feature types, and each of the plurality of metadata feature types has an associated intra cluster feature variance.

The cluster information can include a hit rate. The hit rate may be a number of times data corresponding to a cache entry (e.g. cache entry 304A) is accessed by a cache client in a pre-defined time period. The cache client can be the UVM 120A, the CVM 130, the request interface 230, the metadata interface 232, a computer processor in the storage pool 170, or another block configured to access data. In some implementations, the hit rate is an average hit rate per entry stored in the cluster over a time window. In some implementations, the hit rate is a decayed hit rate. The decayed hit rate can be computed as a moving average. In some embodiments, the decayed hit rate is a sum of a fraction of a hit rate of a previous time period and a hit rate of a current time period immediately after the previous time period. The fraction may be a half.

The cluster information can include a number of entries in the cluster. The number of entries in the cluster can be used for calculations of per-entry parameters. For example, calculating the hit rate per entry includes calculating a ratio of the hit rate per cluster and the number of entries in the cluster.

The cluster database 402 may be located storage in the storage pool 170. In some embodiments, the cluster database 402 is located in the cache 210. In some embodiments, the cluster information may be stored in the cache entries 304. The cluster database 402 may be implemented as a data object stored in physical memory. Although not shown, the cluster database 402 may be associated with any type of hardware, software, and/or firmware component that enables the functionality of the cluster database 402 described herein.

The entry assignor 404 can be configured to assign each of the cache entries 304 to one of the plurality of clusters 302 based on the metadata associated with the plurality of clusters 302 and an cache entry being assigned. Responsive to new cache entries being generated, the entry assignor 404 can be configured to assign the new cache entries. The entry assignor 404 can be configured to determine a plurality of feature distances, wherein each feature distance is between a metadata feature value of the new cache entry and a respective intra cluster feature mean. As such, each of the plurality of clusters 302 includes a plurality of metadata feature types, and each of the plurality of metadata feature types is associated with a feature distance. In some embodiments, the entry assignor 404 can be configured to compute the plurality of intra cluster feature means which can is used to determine the plurality of feature distances. The entry assignor 404 can be configured to determine a total distance between the new cache entry and a respective cluster. As such, each of the plurality of clusters 302 is associated with a total distance. In some embodiments, the total distance is computed as a square root of a sum of squares of a subset of the plurality of feature distances, wherein the subset of the plurality of feature distances includes all feature distances associated with a same cluster. As such, the total distance can be computed as a Euclidean distance of the subset of the plurality of feature distances. In some embodiments, the total distance is computed as a ratio of a sum of the subset of the plurality of feature distances and a count of feature distances included in the subset of the plurality of feature distances. In some embodiments, before computing the total distance, each of the feature distances can be normalized to have values between 0 and 1, wherein the normalized feature distance is computed as a ratio of the feature distance and a feature distance of the subset of the plurality of feature distances having a highest value.

The entry assignor 404 can be configured to determine a plurality of total distances, wherein each of the plurality of total distances is associated with a unique cluster. The entry assignor 404 can be configured to determine a pre-defined distance threshold. The entry assignor 404 can be configured to determine a lowest total distance having a lowest value of the plurality of total distances. Responsive to the lowest total distance being lower than the pre-defined distance threshold, the entry assignor 404 can be configured to assign the new cache entry to the cluster associated with the lowest total distance. Responsive to the lowest total distance being higher than the pre-defined distance threshold, the entry assignor 404 can be configured to create the new cluster and to assign the new cache entry to the new cluster. In some embodiments, responsive to creating the new cluster, the entry assignor 404 can increase the pre-defined distance threshold. Responsive to assigning the new cache entry, the entry assignor 404 can update one or more of the intra cluster feature means, the intra cluster feature variances, value ranges (described below), and feature value counts (described below). Responsive to the new cache entry being assigned to the closest cluster, the entry assignor 404 may update calculating each of the intra cluster feature means of the closest cluster by including metadata feature values of the new cache entry in the calculations, such that each of the metadata feature values of the new cache entry is calculated together with the subset of metadata feature values of the same metadata feature type. Responsive to the new cache entry being assigned to the new cluster, the entry assignor 404 may create new intra cluster feature means equal to the metadata feature values of the new cache entries.

The entry assignor 404 can be implemented as an application running on the cluster manager 234. In some embodiments, the entry assignor 404 can be executed as one or more processing units in the cluster manager 234. In some embodiments, the entry assignor 404 can be stored in the cache 210 or other block in the storage pool 170 and can be executed by one or more processors in the storage pool 170. Although not shown, the entry assignor 404 may be associated with any type of hardware, software, and/or firmware component that enables the functionality of the entry assignor 404 described herein.

The feature selector 406 can be configured to apply feature weights to each of the feature distances based on an importance of the metadata feature type associated with the feature distance. In some embodiments, the feature selector 406 uses a function of one or more variances as a proxy for the importance of the metadata feature type. The feature selector 406 can be configured to compute an inter cluster feature variance as a variance of a subset of intra cluster feature means, wherein the subset of intra cluster feature means includes all intra cluster feature means associated with a same metadata feature type. The feature selector 406 can be configured to compute an intra cluster feature variance. The feature selector 406 can be configured to determine a feature weight as a ratio of the inter cluster feature variance and the intra cluster feature variance. Thus, each of the plurality of clusters 302 includes a plurality of metadata feature types, and each of the plurality of metadata feature types has an associated feature weight.

In some embodiments, the feature selector 406 can be configured to estimate the intra cluster feature variance based on a lightweight function. The feature selector 406 can be configured to partition a continuum into a plurality of metadata feature value ranges (also referred to herein as "value ranges") to which metadata feature values can be properly allocated. For example, if a first value range is 0-5, and a first metadata feature value is 3, the first metadata feature value is properly allocated to the first value range. The feature selector 406 can be configured to determine a plurality of feature value counts, wherein each of the plurality of clusters 302 includes a plurality of metadata features, and each of the plurality of metadata features includes a metadata feature type and a metadata feature value. Each metadata feature type can have an associated plurality of value ranges, and each of the plurality of value ranges has a corresponding feature value count. The feature selector 406 can be configured to compute a feature value count as a number of metadata feature values that are properly allocated to the value range associated with the feature value count.

The feature selector 406 can be configured to estimate the intra cluster feature variance based on the plurality of value ranges and the plurality of feature value counts. In some embodiments, the feature selector 406 can be configured to compute the intra cluster feature variance as the difference of two values, wherein the first value is a sum of a plurality of products, wherein each product is a midpoint of one of the value ranges and a square of the corresponding feature value count. The second value is the intra cluster feature mean squared. In some embodiments, responsive to the new cache entry being assigned to the cluster, the feature selector 406 is configured to update a subset of the plurality of feature value counts corresponding to the cluster to whom the new cache entry is assigned. Responsive the new cache entry being assigned to the cluster, the feature selector 406 can update one or more of the intra cluster feature means, the intra cluster feature variances, the value ranges, and the feature value counts.

In some embodiments, the feature selector 406 uses a membership ratio as a proxy for importance of a metadata feature. The feature selector 406 can be configured to compute the membership ratio of a numerator and a denominator. The denominator can be a number of cache entries included in a cluster of the plurality of clusters 302. The numerator can be a difference between the number of cache entries included in the cluster and a second number of cache entries included in the cluster having a first metadata feature value.

In some embodiments, responsive to the metadata feature type being continuous (e.g. timestamp or number of times accessed), the feature selector 406 is configured to compute a weighted feature distance as a product of the feature distance and the feature weight. The feature selector 406 can be configured to send the weighted feature distance to the entry assignor 404. In some embodiments, the feature selector 406 is configured to send the feature weight to the entry assignor 404 such that the entry assignor 404 can compute the weighted feature distance. In some embodiments, responsive to the metadata feature being discrete (e.g. client ID), the feature selector 406 can be configured to compute the membership ratio and send the membership ratio to the entry assignor 404. The entry assignor 404 can be configured to compute the total distance as a sum of all of the weighted feature distances and all of the membership ratios. In some embodiments, the total distance is computed as a ratio of a first number and a second number. The first number is a subset of a plurality of weighted feature distances and membership ratios, wherein the subset of a plurality of weighted feature distances and membership ratios includes all weighted feature distances and membership ratios associated with a same cluster. The second number is a number of weighted feature distances and membership ratios included in the subset of a plurality of weighted feature distances and membership ratios. In some embodiments, before computing the total distance, each of the weighted feature distances can be normalized to have values between 0 and 1, wherein the normalized weighted feature distance is computed as a ratio of the weighted feature distance and a weighted feature distance of the subset of the plurality of weighted feature distances having a highest value.

The feature selector 406 can be implemented as an application running on the cluster manager 234. In some embodiments, the feature selector 406 can be executed as one or more processing units in the cluster manager 234. In some embodiments, the feature selector 406 can be stored in the cache 210 or other block in the storage pool 170 and can be executed by one or more processors in the storage pool 170. Although not shown, the feature selector 406 may be associated with any type of hardware, software, and/or firmware component that enables the functionality of feature selector 406 described herein. In some embodiments, functions of the entry assignor 404 and the feature selector 406 can be implemented as one or more applications. For example, a first application can perform cluster computations periodically (e.g. calculate intra cluster feature means, intra cluster feature variances, and cluster hit rates). Responsive to receiving the new cache entry, a second application can perform computations related to the new cache entry (e.g. calculate weighted feature distances, membership ratios and distances).

The entry evictor 408 can be configured to determine a cache entry to evict from the cache 210 to the backend store 220 based on hit rate criteria and recency criteria. In some embodiments, the entry evictor 408 is configured to determine an amount of available memory of the cache 210 for creating a new cache entry responsive to receiving the new cache entry. Responsive to determining that the amount of the available memory of the cache 210 for creating the new cache entry is less than a second amount of memory needed to create the new cache entry, the entry evictor 408 can be configured to evict a cache entry based on hit rate criteria and recency criteria.

In some embodiments, the entry evictor 408 can be configured to determine a cluster having the lowest decayed hit rate. The entry evictor 408 can be configured to select an oldest cache entry in the cluster having the lowest decayed hit rate. The oldest cache entry can be a cache entry having a lowest value timestamp (e.g. being the least recently accessed). The entry evictor 408 can be configured to send a command to the cache 210 to evict the selected cache entry.

The entry evictor 408 can be implemented as an application running on the cluster manager 234. In some embodiments, the entry evictor 408 can be executed as one or more processing units in the cluster manager 234. In some embodiments, the entry evictor 408 can be stored in the cache 210 or other block in the storage pool 170 and can be executed by one or more processors in the storage pool 170. Although not shown, the entry evictor 408 may be associated with any type of hardware, software, and/or firmware component that enables the functionality of entry evictor 408 described herein. In some embodiments, functions of the entry assignor 404, the feature selector 406, and the entry evictor 408 can be implemented as one or more applications.

Figure 5A:
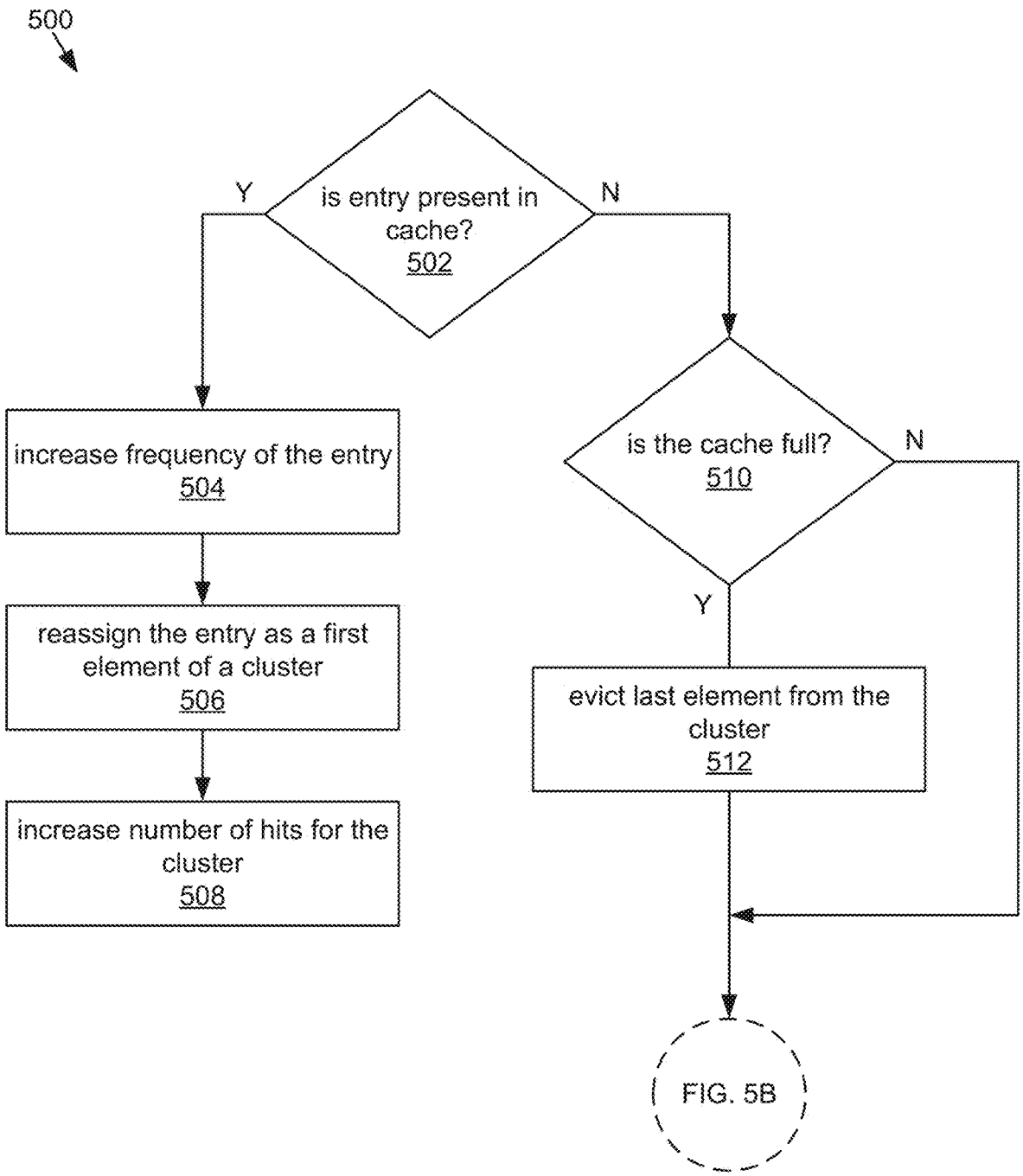
FIG. 5A and FIG. 5B are a flow chart of a process for evicting a selected cache entry and assigning a new cache entry to a cluster, in accordance with the embodiment of the adaptive cache system in FIG. 2.
Figure 5B:
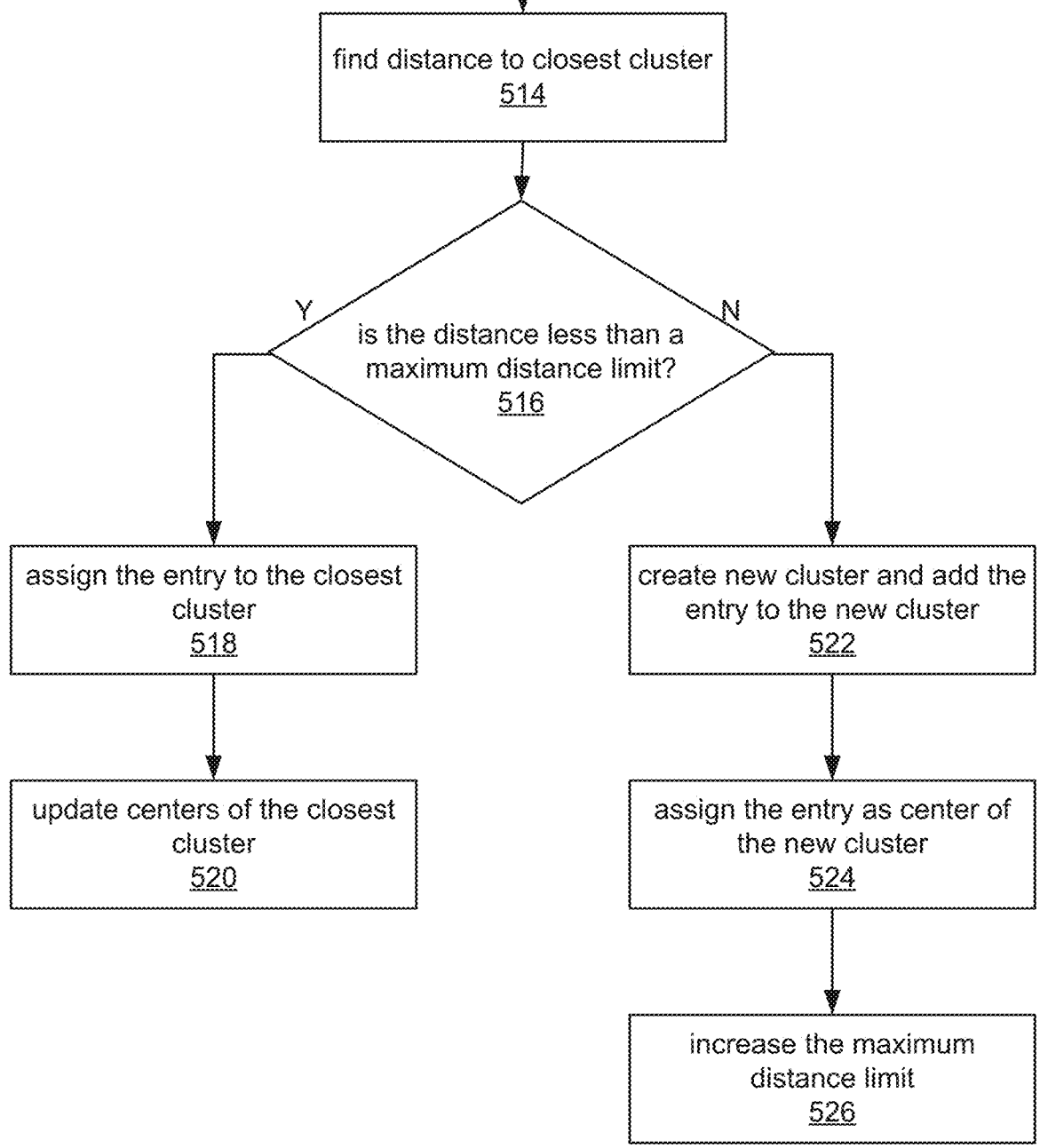

FIG. 5A and FIG. 5B are a flow chart of a process for evicting a selected cache entry and assigning a received cache entry to a cluster, in accordance with the embodiment of the adaptive cache system 200 in FIG. 2. Referring to FIG. 5A, at step 502, the cluster manager 234 can determine whether the received cache entry is present in the cache 210. If the cluster manager 234 determines that the received cache entry is present in the cache 210, then, at step 504, the cluster manager 234 can increase a frequency of the received cache entry. In some embodiments, the frequency (e.g. number of times accessed in a pre-defined time period) is a first metadata feature type. At step 506, the cluster manager 234 can reassign the received cache entry as a first element of the cluster. The cluster manager 234 can rank the cache entries of the selected cluster based on a timestamp of each of the cache entries. As such, the most recently accessed entry (e.g. the received cache entry) will be the first element of the cache 210 and the least recently accessed will be a last element of the cache 210. In some embodiments, the timestamp is a second metadata feature type. At step 508, the cluster manager 234 can increase number of hits (e.g. a hit rate) for the cluster. If, at step 502, the cluster manager 234 determines that the received cache entry is not present in the cache 210, then, at step 510, the cluster manager 234 can determine whether the cache 210 is full. In some embodiments, determining whether the cache 210 is full includes determining whether the amount of the available memory of the cache 210 for creating the received cache entry is less than a second amount of memory needed to create the received cache entry. If the cluster manager 234 determines that the cache 210 is full, then, at step 512, the cluster manager 234 can evict the selected cache entry from a selected cluster. In some embodiments, the cluster manager 234 selects a cluster having a lowest hit rate. In some embodiments, the hit rate is a decayed hit rate. The cluster manager 234 can select the last element of the selected cluster. If at step 510, the cluster manager 234 determines that the cache 210 is not full, or upon completing step 512, step 514 can be performed.

Referring to FIG. 5B, at step 514, the cluster manager 234 can find a distance to a closest cluster. At step 516, the cluster manager 234 can determine if the distance is less than a maximum distance limit. If the cluster manager 234 determines that the distance is less than the maximum distance limit, then, at step 518, the cluster manager 234 can assign the entry to the closest cluster. At step 520, the cluster manager 234 can update a cluster center of the closest cluster. In some embodiments, the cluster center includes a plurality of intra cluster feature means, each of the plurality of intra cluster feature means corresponding to a metadata feature type of the closest cluster. If, at step 516, the cluster manager 234 can determines that the distance is not less than the maximum distance limit, then, at step 522, the cluster manager 234 can create a new cluster and assign the entry to the new cluster. At step 524, the cluster manager 234 can assign the entry as the center of the new cluster. At step 526, the cluster manager 234 can increase the maximum distance limit.

Figure 6:
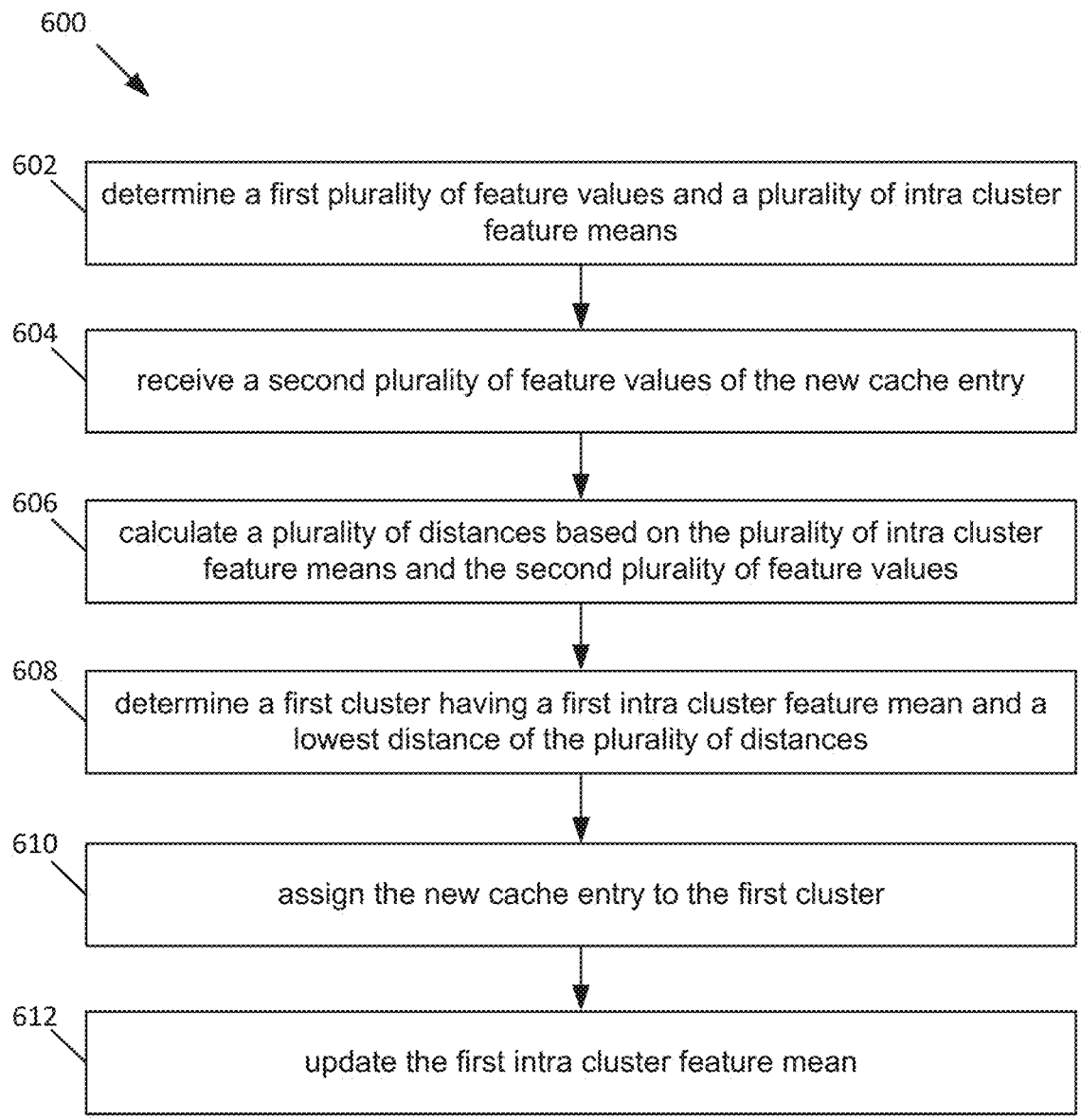
FIG. 6 is a flow chart of a process for assigning a cache entry to a cluster, in accordance with the embodiment of the adaptive cache system in FIG. 2.

FIG. 6 is a flow chart of a process for assigning a cache entry to a cluster, in accordance with the embodiment of the adaptive cache system 200 in FIG. 2. At step 602, the cluster manager 234 can determine a plurality of first metadata feature values. In some embodiments, the plurality of first metadata feature values correspond to a plurality of metadata feature types. Each cluster of the plurality of clusters 302 can include the plurality of cache entries 304 and each of the plurality of cache entries 304 can include a plurality of metadata features. Each of the plurality of metadata features can include a metadata feature type of the plurality of metadata feature types and a metadata feature value. The plurality of metadata feature types can be common to all of the plurality of cache entries 304 of all of the plurality of clusters 302.

The cluster manager 234 can calculate a plurality of intra cluster feature means. Each of the plurality of intra cluster feature means can be based on a subset of the plurality of first metadata feature values. In some embodiments, each of the plurality of metadata feature types of each of the plurality of clusters 302 has an associated intra cluster feature mean. The subset of plurality of first metadata feature values can correspond to a same metadata feature type and a same cluster as the associated intra cluster feature mean. In some embodiments, the cluster manager 234 retrieves the plurality of intra cluster feature means from an external block such as the cache 210.

At step 604, the cluster manager 234 can receive a plurality of second metadata feature values of the new cache entry. In some embodiments, each of the plurality of second metadata feature values corresponds to one of the plurality of metadata feature types. In some embodiments, receiving the plurality of second metadata feature values can be responsive to sending a request to create a new cache entry.

At step 606, the cluster manager 234 can calculate a plurality of distances. In some embodiments, the plurality of distances are a plurality of total distances. In some embodiments, each of the plurality of clusters 302 includes a total distance. The total distance can be calculated based on a subset of a plurality of feature distances associated with a same cluster. In some embodiments, each of the plurality of metadata feature types of each of the plurality of clusters 302 includes a feature distance. The feature distance associated with a metadata feature type of a cluster can be calculated as a difference between a corresponding intra cluster feature mean and a corresponding metadata feature value of the received cache entry.

At step 608, the cluster manager 234 can determine a first cluster having a first intra cluster feature mean and a first distance. In some embodiments, the first distance is a distance having the lowest value of the plurality of distances. In some embodiments, the cluster manager 234 can compare the first distance to a pre-defined distance threshold.

At step 610, the cluster manager 234 can assign the new cache entry to the first cluster. In some embodiments, assigning the new cache entry is responsive to determining that the first distance is lower than a pre-defined distance threshold. Responsive to the first distance not being lower than a pre-defined distance threshold, the cluster manager 234 can create a new cluster and assign the new cache entry to the new cluster. Responsive to creating a new cluster, the cluster manager 234 can increase the pre-defined distance threshold.

At step 612, the cluster manager 234 can update the first intra cluster feature mean. In some embodiments, the updated intra cluster feature mean is re-calculated as a mean including the corresponding metadata feature value of the received cache entry.

Figure 7:
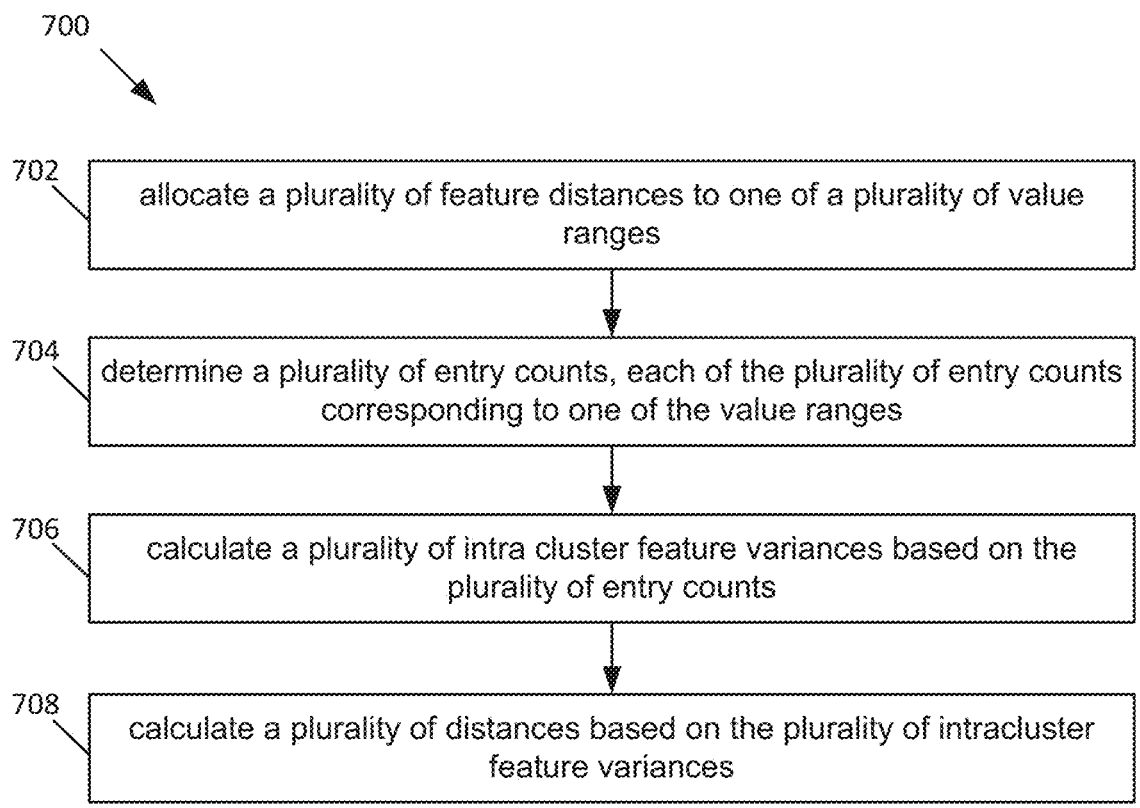
FIG. 7 is a flow chart of a process for selecting features, in accordance with the embodiment of the adaptive cache system in FIG. 2.

FIG. 7 is a flow chart of a process for selecting features, in accordance with the embodiment of the adaptive cache system 200 in FIG. 2. At step 702, the cluster manager 234 can allocate each of a plurality of feature distances to one of a plurality of value ranges. At step 704, the cluster manager 234 can determine a plurality of feature counts. In some embodiments, each of the plurality of value ranges has a feature count. At step 706, the cluster manager 234 can calculate a plurality of the intra cluster feature variances based on the plurality of feature counts. Each of the plurality of metadata feature types of each of the plurality of clusters 302 can have an associated intra cluster feature variance.

At step 708, the cluster manager 234 can calculate a plurality of distances based on the plurality of intra cluster feature variances. In some embodiments, the plurality of distances are a plurality of total distances. The cluster manager 234 can calculate the plurality of distances based on a plurality of feature weights. In some embodiments, the cluster manager 234 can calculate the plurality of feature weights as a plurality of variance ratios, each variance ratio calculated as a ratio of one of a plurality of inter cluster feature variances and one of the plurality of intra cluster feature variances. Each of the plurality of clusters 302 can include an inter cluster feature variance.

What is claimed:
1. An adaptive cache system comprising:
   a cache that stores a plurality of clusters and a first cache entry; and
   a processing unit that:
      receives a first feature value associated with the first cache entry;
      for each cluster of the plurality of clusters:
         calculates a cluster feature mean;

computes a variance from the cluster feature mean of feature instances in the cluster; and calculates a distance of a plurality of distances based on the first feature value, the cluster feature mean, and the variance; and assigns the first cache entry to a first cluster of the plurality of clusters, the first cluster having a lowest distance of the plurality of distances; and evicts the first cache entry upon determining that a first amount of available memory of the cache to create the first cache entry is less than a second amount of memory needed to create the first cache entry.

2. The system of claim 1, wherein each cluster includes a plurality of cluster feature values; and the processing unit:

allocates each cluster feature value of the plurality of cluster feature values to a value range of a plurality of value ranges; and calculates the variance based on a plurality of midpoints and a plurality of feature value counts; wherein each midpoint of the plurality of midpoints represents a corresponding value range and each feature value count of the plurality of feature value counts equals a number of cluster feature values allocated to a corresponding value range.

3. The system of claim 2, wherein, for each value range, the processing unit:

determines the midpoint; and determines the feature value count.

4. The system of claim 1, wherein the processing unit calculates the variance as a ratio of a first variance and a second variance.

5. The system of claim 1, wherein, for each cluster, each of the first feature value, the cluster feature mean, the variance, and the distance includes a plurality of feature types and wherein the processing unit calculates a total distance as a sum the plurality of feature types included in the distance.

6. The system of claim 1, wherein the processing unit further determines a cluster hit rate of a plurality of cluster hit rates and evicts a second cache entry based on the plurality of cluster hit rates.

7. The system of claim 6, wherein the processing unit:

determines a second cluster having a lowest cluster hit rate of the plurality of cluster hit rates; and selects the second cache entry from the second cluster.

8. The system of claim 6, wherein the cluster hit rate is a decaying cluster hit rate.

9. A computer-implemented method comprising:

receiving, by a processing unit, a first feature value associated with a first cache entry;

for each cluster of a plurality of clusters:

calculating, by the processing unit, a cluster feature mean;

approximately computing by the processing unit, a variance from the cluster feature mean of feature instances in the cluster; and calculating, by the processing unit, a distance of a plurality of distances based on the first feature value, the cluster feature mean, and the variance; and assigning, by the processing unit, the first cache entry to a first cluster of the plurality of clusters, the first cluster having a lowest distance of the plurality of distances; and evicting the first cache entry upon determining that a first amount of available memory of the cache to create the first cache entry is less than a second amount of memory needed to create the first cache entry.

10. The method of claim 9, wherein each cluster includes a plurality of cluster feature values and the method further comprises:

allocating, by the processing unit, each cluster feature value of the plurality of cluster feature values to a value range of a plurality of value ranges; and calculating, by the processing unit, the variance based on a plurality of midpoints and a plurality of feature value counts; wherein each midpoint of the plurality of midpoints represents a corresponding value range and each feature value count of the plurality of feature value counts equals a number of cluster feature values allocated to a corresponding value range.

11. The method of claim 10, wherein, for each value range, the method further comprises:

determining, by the processing unit, the midpoint; and determining, by the processing unit, the feature value count.

12. The method of claim 9, further comprising calculating, by the processing unit, the variance as a ratio of a first variance and a second variance.

13. The method of claim 9, wherein, for each cluster, each of the first feature value, the cluster feature mean, the variance, and the distance includes a plurality of feature types, the method further comprising calculating, by the processing unit, a total distance as a sum the plurality of feature types included in the distance.

14. The method of claim 9, further comprising determining a cluster hit rate of a plurality of cluster hit rates and evicting a second cache entry based on the plurality of cluster hit rates.

15. The method of claim 14, further comprising:

determining, by the processing unit, a second cluster having a lowest cluster hit rate of the plurality of cluster hit rates; and selecting, by the processing unit, the second cache entry from the second cluster.

16. The method of claim 14, wherein the cluster hit rate is a decaying cluster hit rate.

17. A non-transitory computer-readable storage medium having computer-executable instructions stored thereon that, upon execution by one or more processors, causes the one or more processors to perform operations comprising:

receiving a first feature value associated with a first cache entry;

for each cluster of a plurality of clusters:

calculating a cluster feature mean;

approximately computing a variance from the cluster feature mean of feature instances in the cluster; and calculating a distance of a plurality of distances based on the first feature value, the cluster feature mean, and the variance; and assigning the first cache entry to a first cluster of the plurality of clusters, the first cluster having a lowest distance of the plurality of distances; and evicting the first cache entry upon determining that a first amount of available memory of the cache to create the first cache entry is less than a second amount of memory needed to create the first cache entry.

18. The storage medium of claim 17, wherein each cluster includes a plurality of cluster feature values and the operations further comprise:

allocating each cluster feature value of the plurality of cluster feature values to a value range of a plurality of value ranges; and calculating the variance based on a plurality of midpoints and a plurality of feature value counts; wherein each midpoint of the plurality of midpoints represents a corresponding value range and each feature value count of the plurality of feature value counts equals a number of cluster feature values allocated to a corresponding value range.

19. The storage medium of claim 18, wherein, for each value range, the operations further comprise:
   determining the midpoint; and
   determining the feature value count.

20. The storage medium of claim 17, wherein the operations further comprise calculating the variance as a ratio of a first variance and a second variance.

21. The storage medium of claim 17, wherein, for each cluster, each of the first feature value, the cluster feature mean, the variance, and the distance includes a plurality of feature types, the operations further comprising calculating a total distance as a sum the plurality of feature types included in the distance.

22. The storage medium of claim 17, wherein the operations further comprise determining a cluster hit rate of a plurality of cluster hit rates and evicting a second cache entry based on the plurality of cluster hit rates.

23. The storage medium of claim 22, wherein the operations further comprise:
   determining a second cluster having a lowest cluster hit rate of the plurality of cluster hit rates; and
   selecting the second cache entry from the second cluster.

24. The storage medium of claim 23, wherein the cluster hit rate is a decaying cluster hit rate.

\* \* \* \* \*